(12) United States Patent
Yeh et al.

(10) Patent No.: US 8,564,553 B2
(45) Date of Patent: Oct. 22, 2013

(54) ELECTRONIC STYLUS, CAPACITIVE TOUCHPAD MODULE, AND APPARATUS FOR TOUCH INPUT

(75) Inventors: I-Hau Yeh, Taipei (TW); Chi-Tein Yeh, Chiayi (TW); Tsun-Min Wang, Changhua (TW); Chun-Chung Huang, Hsinchu (TW); Chung-Han Cheng, Kaohsiung (TW); Hung-Ming Huang, Sanchong (TW)

(73) Assignee: Elan Microelectronics Corporation, Hsinchu (TW)

( * ) Notice: Subject to any disclaimer, the term of this patent is extended or adjusted under 35 U.S.C. 154(b) by 417 days.

(21) Appl. No.: 12/651,575

(22) Filed: Jan. 4, 2010

(65) Prior Publication Data

US 2010/0170726 A1 Jul. 8, 2010

Related U.S. Application Data

(60) Provisional application No. 61/142,690, filed on Jan. 6, 2009.

(51) Int. Cl.
*G09G 5/00* (2006.01)
*G06F 3/033* (2013.01)
*G06F 3/041* (2006.01)

(52) U.S. Cl.
USPC ...... 345/173; 345/179; 178/18.06; 178/19.03

(58) Field of Classification Search
USPC ......... 178/18.01, 18.06, 19.03, 19.06, 19.07; 345/173, 179
See application file for complete search history.

(56) References Cited

U.S. PATENT DOCUMENTS

| | | | | |
|---|---|---|---|---|
| 4,318,096 A * | 3/1982 | Thornburg et al. | ........... | 345/179 |
| 4,492,819 A * | 1/1985 | Rodgers et al. | ............ | 178/18.05 |
| 4,616,106 A * | 10/1986 | Fowler et al. | ............. | 178/18.05 |
| 4,639,720 A * | 1/1987 | Rympalski et al. | ........... | 345/174 |
| 4,672,154 A * | 6/1987 | Rodgers et al. | ............ | 178/19.07 |
| 4,831,566 A * | 5/1989 | Matthews et al. | ............... | 702/95 |
| 5,138,118 A * | 8/1992 | Russell | ...................... | 178/19.03 |
| 5,369,227 A * | 11/1994 | Stone | ......................... | 178/19.07 |
| 5,528,002 A * | 6/1996 | Katabami | .................. | 178/19.06 |
| 5,877,459 A * | 3/1999 | Prater | ....................... | 178/19.06 |
| 6,133,906 A * | 10/2000 | Geaghan | ...................... | 345/179 |
| 6,424,335 B1 * | 7/2002 | Kim et al. | ..................... | 345/158 |
| 6,441,810 B1 * | 8/2002 | Skoog et al. | .................. | 345/179 |
| 7,436,164 B2 * | 10/2008 | Vos | ............................... | 323/293 |
| 7,474,300 B2 * | 1/2009 | Katsurahira et al. | .......... | 345/179 |
| 7,612,767 B1 * | 11/2009 | Griffin et al. | ................. | 345/179 |
| 8,049,732 B2 * | 11/2011 | Hotelling et al. | ............. | 345/173 |
| 2007/0085836 A1 * | 4/2007 | Ely | ................................ | 345/173 |
| 2007/0262966 A1 * | 11/2007 | Nishimura et al. | ........... | 345/173 |
| 2008/0156546 A1 * | 7/2008 | Hauck | ........................ | 178/19.01 |

* cited by examiner

*Primary Examiner* — Quan-Zhen Wang
*Assistant Examiner* — Michael J Eurice
(74) *Attorney, Agent, or Firm* — Rosenberg, Klein & Lee

(57) ABSTRACT

An electronic stylus emits an excitation signal to apply to a trace of a capacitive touchpad module near a touch point when the electronic stylus touches the capacitive touchpad module, so as to change a waveform of a charging/discharging signal in the trace, and depending on the waveform variation, the capacitive touchpad module can identify the touch point.

29 Claims, 20 Drawing Sheets

ELECTRONIC STYLUS, CAPACITIVE TOUCHPAD MODULE, AND APPARATUS FOR TOUCH INPUT

REFERENCE TO RELATED APPLICATIONS

This Application is based on Provisional Patent Application Ser. No. 61/142,690, filed 6 Jan. 2009.

FIELD OF THE INVENTION

The present invention is related generally to an apparatus for touch input and, more particularly, to an electronic stylus for a capacitive touchpad module.

BACKGROUND OF THE INVENTION

Currently, the mainstream touch control technologies include capacitive touch sensing and resistive touch sensing, of which the resistive touch sensing technology may be further divided into four-wire resistive touch sensing, five-wire resistive touch sensing and eight-wire resistive touch sensing. A resistive touch sensor is constructed mainly by an indium tin oxide (ITO) glass plate, an ITO thin film, and a spacer for separating the ITO glass plate from the ITO thin film. When a finger, a stylus or another medium touches on a resistive touch sensor, it will cause a short-circuit between the ITO glass plate and the ITO thin film at the touch point and thereby induce a voltage drop, so that the touch point can be sensed responsive to the voltage drop. For capacitive touch input, it may be classified into surface capacitance touchpad module and projected capacitance touchpad module. A capacitive touchpad module may include an ITO, a membrane, a printed circuit board (PCB), or a flexible printed circuit (FPC) board. When a finger or a conductor touches on a capacitive touchpad module, it will cause a capacitance variation at the touch point and thereby the touch point can be sensed accordingly.

As the capacitive touch sensing does not rely on deformation of a sensor to sense the touch point, it is impossible to use a stylus with a capacitive touchpad module, as does for the resistive touch sensing. Even if the tip of a stylus were replaced with a conductor, it would still be impossible for the stylus to induce a sufficient capacitance variation of a trace of the capacitive touchpad module because of the too-small size of the tip. Although this problem may be solved by enlarging the tip of a stylus, the tip, after being enlarged, would become as thick as a finger, which is unfavorable for such applications as handwriting recognition and drawing in a small-sized capacitive touchpad module. Moreover, capacitive touch sensors used in cell phones or notebook computers are usually provided with a plurality of virtual buttons, which are made to be very small and located very close to each other, so it is impossible to correctly click such virtual buttons by use of a stylus having a large tip.

Therefore, it is desired a novel stylus having a small tip for capacitive touch input.

SUMMARY OF THE INVENTION

An object of the present invention is to provide an apparatus and a control method thereof for touch input.

Another object of the present invention is to provide an electronic stylus and a method thereof for touch input.

A further object of the present invention is to provide a capacitive touchpad module and a control method thereof for touch input.

According to the present invention, an apparatus for touch input includes a capacitive touchpad module and an electronic stylus. When the electronic stylus touches the capacitive touchpad module, the electronic stylus emits an excitation signal to apply to a trace of the capacitive touchpad module near a touch point, so as to change a waveform of a charging/discharging signal in the trace. Therefore, the capacitive touchpad module can identify the touch point depending on the waveform variation.

According to the present invention, a control method for an apparatus for touch input includes providing an excitation signal for an electronic stylus, emitting the excitation signal by the electronic stylus to apply to a trace of a capacitive touchpad module near a touch point when the electronic stylus touches the capacitive touchpad module, so as to change a waveform of a charging/discharging signal in the trace, and sensing the touch point according to a variation of the waveform.

According to the present invention, an electronic stylus for touch input to a capacitive touchpad module includes an oscillation circuit for generating an excitation signal, a power circuit connected to the oscillation circuit for providing a supply voltage for the oscillation circuit, and a tip connected to the oscillation circuit for emitting the excitation signal to apply to a trace of the capacitive touchpad module near a touch point when the electronic stylus touches the capacitive touchpad module, so as to change a waveform of a charging/discharging signal in the trace.

According to the present invention, an electronic stylus for touch input to a capacitive touchpad module includes an input terminal connected to the capacitive touchpad module via a signal line for receiving an excitation signal from the capacitive touchpad module, and a tip connected to the input terminal for emitting the excitation signal to apply to a trace of the capacitive touchpad module near a touch point when the electronic stylus touches the capacitive touchpad module, so as to change a waveform of a charging/discharging signal in the trace.

According to the present invention, an electronic stylus for touch input to a capacitive touchpad module includes a down-converter circuit for down-converting a signal transmitted from the capacitive touchpad module to generate an excitation signal, and a tip connected to the down-converter circuit for emitting the excitation signal to apply to a trace of the capacitive touchpad module near a touch point when the electronic stylus touches the capacitive touchpad module, so as to change a waveform of a charging/discharging signal in the trace.

According to the present invention, an electronic stylus for touch input to a capacitive touchpad module includes a demodulation circuit for demodulating a carrier transmitted from the capacitive touchpad module to generate an excitation signal, and a tip connected to the demodulation circuit for emitting the excitation signal to apply to a trace of the capacitive touchpad module near a touch point when the electronic stylus touches the capacitive touchpad module, so as to change a waveform of a charging/discharging signal in the trace.

According to the present invention, a method for an electronic stylus for touch input to a capacitive touchpad module includes applying the excitation signal to a tip of the electronic stylus, and emitting the excitation signal from the tip to apply to a trace of the capacitive touchpad module near a touch point when the electronic stylus touches the capacitive touchpad module, so as to change a waveform of a charging/discharging signal in the trace.

According to the present invention, a capacitive touchpad module includes an output terminal, a trace, and a detection circuit connected to the trace for detecting a charging/discharging signal from the trace to generate an excitation signal, which is related to a phase and a frequency of the charging/discharging signal, to transmit to an electronic stylus via the output terminal.

According to the present invention, a control method for a capacitive touchpad module includes detecting a charging/discharging signal from a trace of the capacitive touchpad module, and generating an excitation signal, which is related to a phase and a frequency of the charging/discharging signal, for transmitting to an electronic stylus.

According to the present invention, a capacitive touchpad module includes a trace, a detection circuit connected to the trace for detecting a charging/discharging signal from the trace to generate a detection signal which is related to a frequency and a phase of the charging/discharging signal, an up-converter circuit connected to the detection circuit for up-converting the detection signal to generate a high-frequency signal, a transceiver system connected to the up-converter circuit for transmitting the high-frequency signal to an electronic stylus.

According to the present invention, a control method for a capacitive touchpad module includes detecting a charging/discharging signal from a trace of the capacitive touchpad module for generating a detection signal which is related to a frequency and a phase of the charging/discharging signal, up-converting the detection signal for generating a high-frequency signal, and transmitting the high-frequency signal to an electronic stylus.

According to the present invention, a capacitive touchpad module includes: a trace, a detection circuit connected to the trace for detecting a charging/discharging signal from the trace to generate a detection signal which is related to a frequency and a phase of the charging/discharging signal, a modulation circuit connected to the detection circuit for generating a carrier according to the detection signal, and a transceiver system connected to the modulation circuit for transmitting the carrier to an electronic stylus.

According to the present invention, a control method for a capacitive touchpad module includes detecting a charging/discharging signal from a trace of the capacitive touchpad module for generating a detection signal which is related to a frequency and a phase of the charging/discharging signal, modulating the detection signal for generating a carrier, and transmitting the carrier to an electronic stylus.

According to the present invention, a control method for a capacitive touchpad module includes detecting a charging/discharging signal from a trace of the capacitive touchpad module for generating a detection signal which is related to a frequency and a phase of the charging/discharging signal, embedding data into a carrier according to the detection signal, and transmitting the carrier to an electronic stylus.

According to the present invention, a control method for a capacitive touchpad module includes detecting a charging/discharging signal from a trace of the capacitive touchpad module, and determining either a finger or an electronic stylus touching the capacitive touchpad module, depending on an increase or a decrease of an analog-to-digital conversion value of the charging/discharging signal.

BRIEF DESCRIPTION OF THE DRAWINGS

These and other objects, features and advantages of the present invention will become apparent to those skilled in the art upon consideration of the following description of the preferred embodiments according to the present invention taken in conjunction with the accompanying drawings, in which.

DETAILED DESCRIPTION OF THE INVENTION

Figure 1:
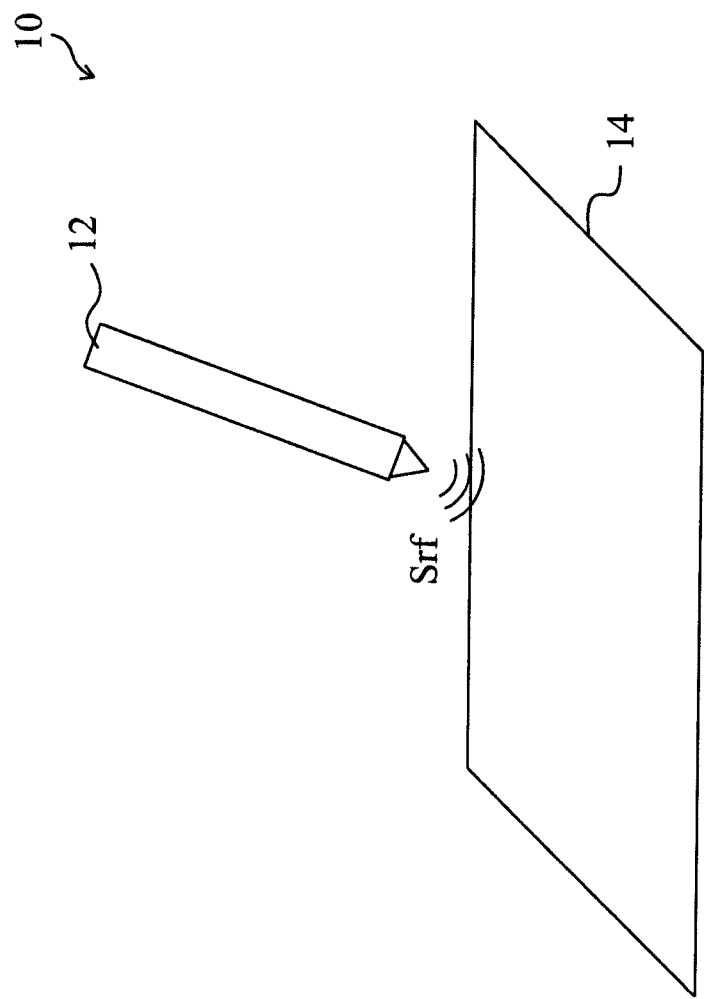
FIG. 1 is a diagram showing an apparatus for touch input according to the present invention.
Figure 2:
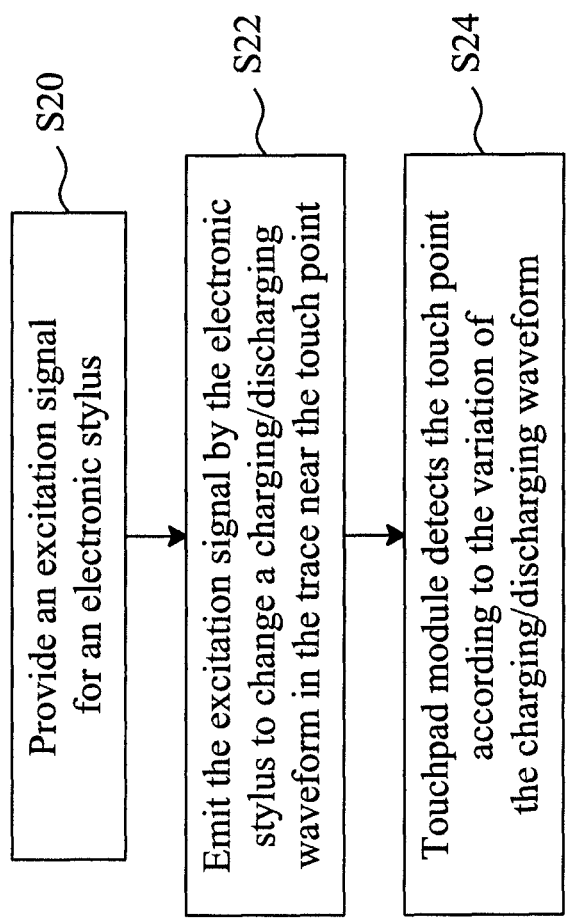
FIG. 2 is a flowchart for the apparatus shown in FIG. 1 when it is operated for touch input.

For capacitive touch input, as shown in FIG. 1, an apparatus 10 includes an electronic stylus 12 and a capacitive touchpad module 14. For sensing the capacitance of a trace, the capacitive touchpad module 14 will charge/discharge the trace at a charging/discharging frequency, so as to generate a charging/discharging signal by the trace. For further detail of the capacitive touchpad module 14, readers may refer to U.S. Pat. No. 5,920,309. FIG. 2 is a flowchart for the apparatus 10 when it is operated for touch input. Referring to FIGS. 1 and 2, in step S20, it is provided the electronic stylus 12 an excitation signal Srf which has a frequency equal to an integral multiple of the charging/discharging frequency. In step S22, the excitation signal Srf is emitted by the electronic stylus 12 to change the charging/discharging waveform in the trace of the capacitive touchpad module 14 near the touch point, so that an effect similar to a finger down to the capacitive touchpad module 14 is obtained. Therefore, in step S24, the capacitive touchpad module 14 may sense the touch point according to the variation of the charging/discharging waveform of the trace. Even if the electronic stylus 12 has a very small-sized tip, the capacitive touchpad module 14 is still able to sense the touch point of the electronic stylus 12. Therefore, it makes handwriting recognition and drawing operations more convenient and allows users to operate a small pattern or virtual button more exactly on a small touch screen. This advantage is especially favorable for applications in portable apparatus such as cell phones and personal digital assistants (PDAs).

Figure 3:
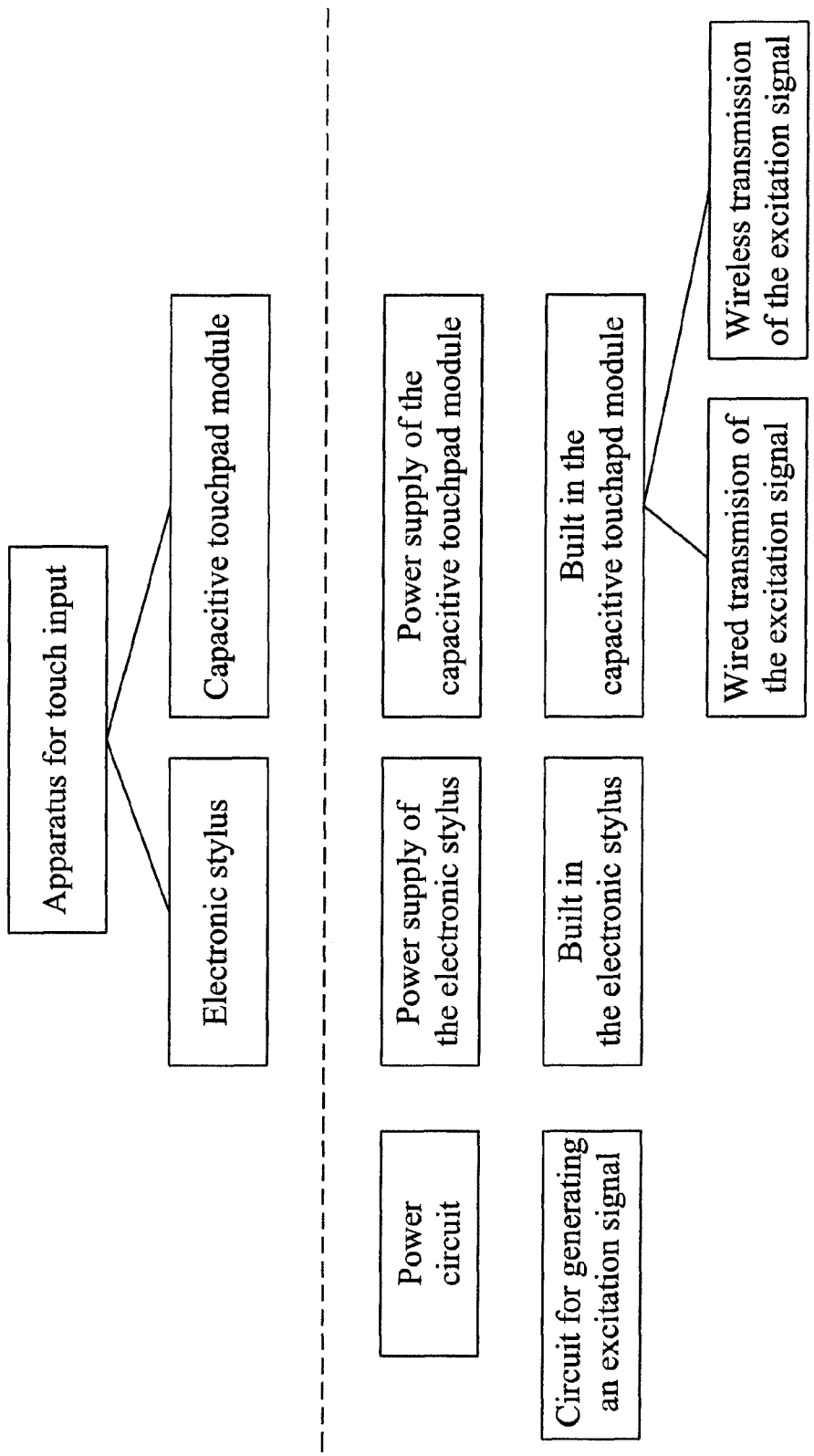
FIG. 3 is a diagram showing the architecture of the apparatus of FIG. 1.

FIG. 3 is a diagram showing the architecture of the apparatus 10 of FIG. 1. To carry out the process shown in FIG. 2, a circuit for generating the excitation signal Srf is built in either the electronic stylus 12 or the capacitive touchpad module 14. If the circuit for generating an excitation signal is built in the electronic stylus 12, it is provided power by a power circuit which is either a power supply of the electronic stylus 12 or a power supply of the capacitive touchpad module 14. If the circuit for generating an excitation signal is built in the capacitive touchpad module 14, the excitation signal is either wired or wireless transmitted to the electronic stylus 12.

Figure 4:
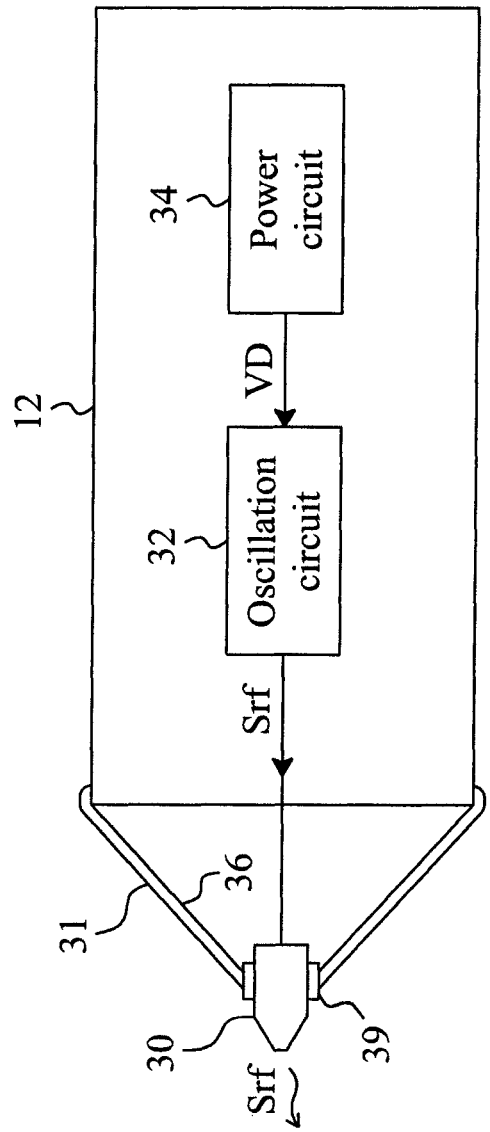
FIG. 4 is a diagram showing an embodiment for an electronic stylus according to the present invention.

FIG. 4 is a diagram showing an embodiment for the electronic stylus 12 of FIG. 1, which includes a power circuit 34 to provide a supply voltage VD, an oscillation circuit 32 to generate the excitation signal Srf, and a tip 30 to emit the excitation signal Srf. The excitation signal Srf is synchronous to and has a constant phase difference from the charging/discharging signal in the trace of the capacitive touchpad module 14. The phase difference may be zero. The tip 30 may be a metal, a flexible conductor, or a metal wrapped by a nonconductor. A metal 36 is around the tip 30 for use as a shielding layer to prevent electromagnetic interference (EMI). Between the tip 30 and the metal 36 is disposed an isolating insulator 39, and an insulator 31 wraps around the metal 36 to shield against ambient interference.

Figure 5:
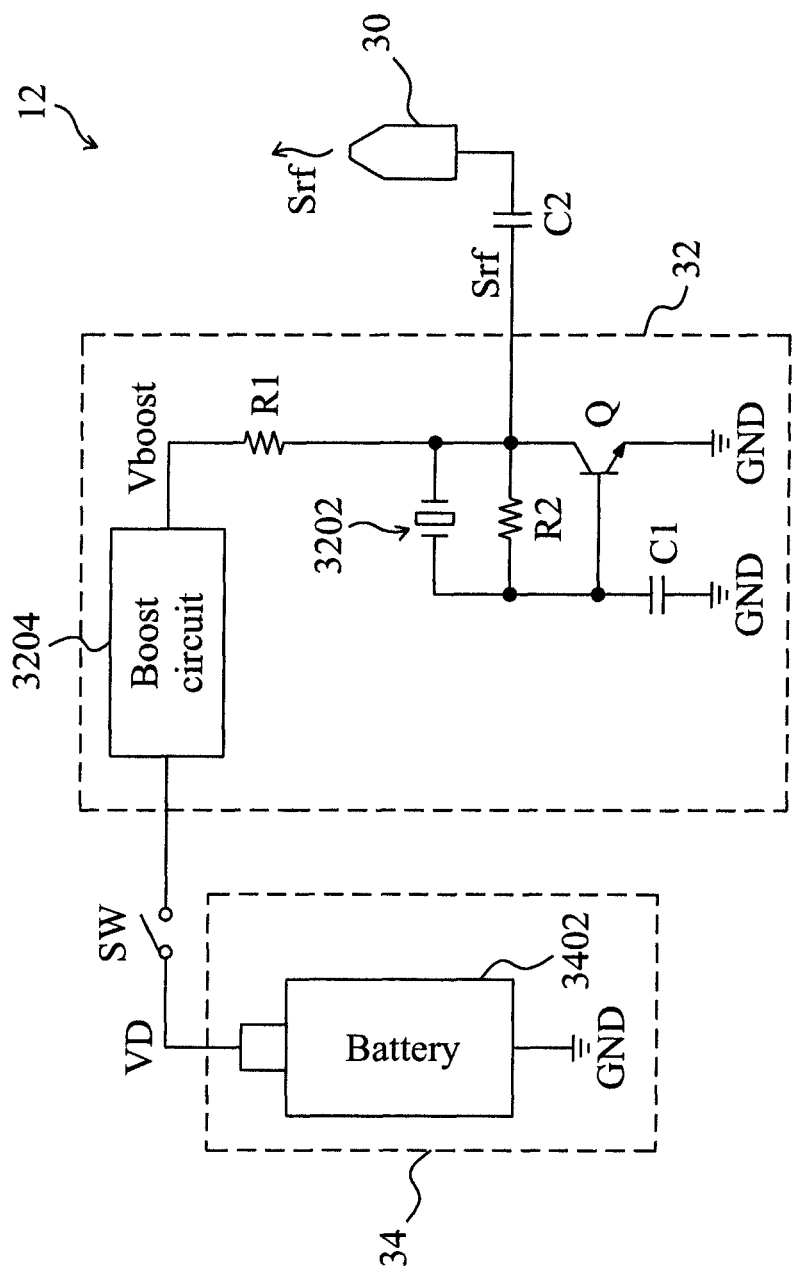
FIG. 5 is a detailed circuit diagram of the electronic stylus of FIG. 4.

FIG. 5 is a detailed circuit diagram of the electronic stylus 12 of FIG. 4. The power circuit 34 includes a battery 3402 for supplying the supply voltage VD. In the oscillation circuit 32, a boost circuit 3204 is connected to the battery 3402 through a switch SW. When the switch SW is closed, the supply voltage VD is provided to the boost circuit 3204 and boosted to generate a voltage Vboost which is fed to a quartz oscillator 3202 to drive the quartz oscillator 3202 to generate the excitation signal Srf. A capacitor C2 connected between the oscillation circuit 32 and the tip 30 couples the excitation signal Srf to the tip 30. When the switch SW is opened, the battery 3402 is disconnected from the boost circuit 3204, so no power will be supplied to the oscillation circuit 32 any longer and consequently, the electronic stylus 12 will no longer emit the excitation signal Srf. In other embodiments, it may modulate the output of the boost circuit 3204 into a carrier to be emitted by the tip 30.

Figure 6:
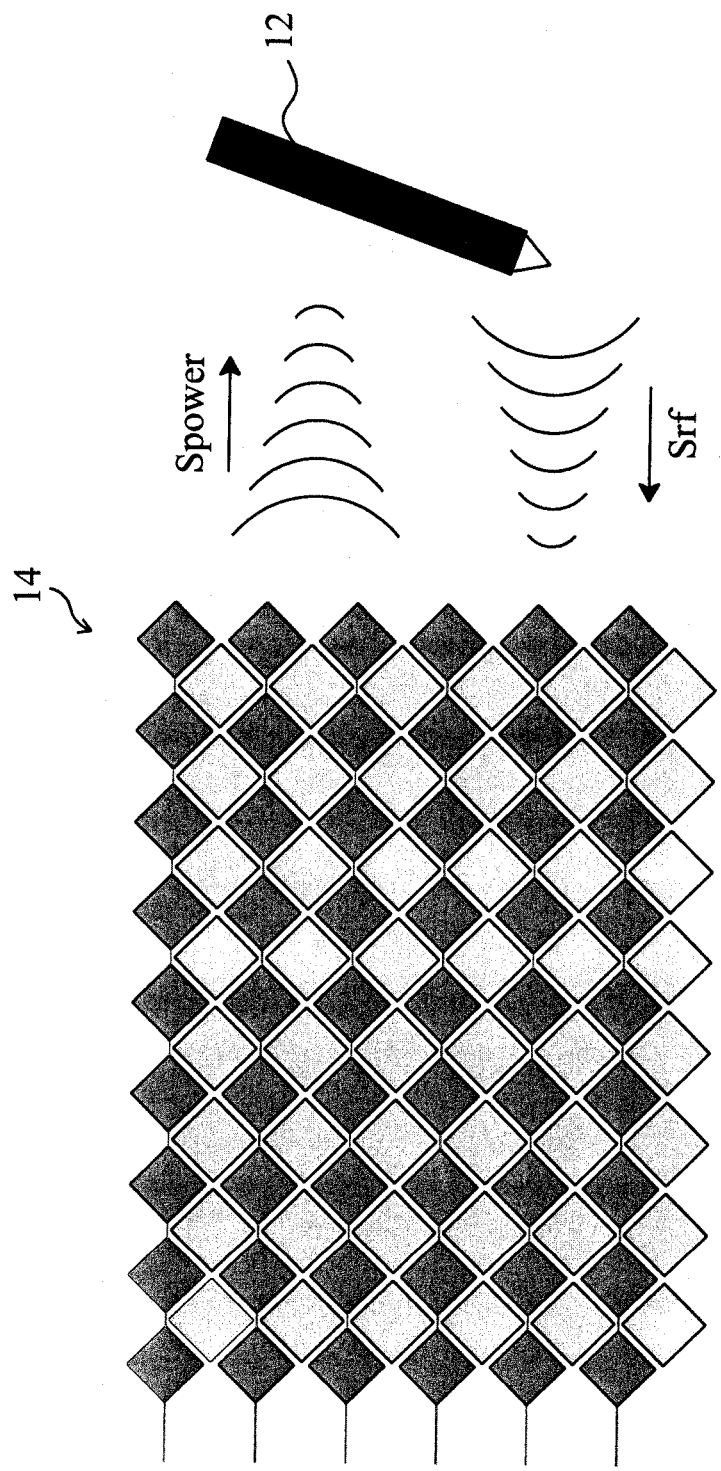
FIG. 6 is a diagram showing an embodiment in which a radio-frequency signal is used to charge an electronic stylus.
Figure 7:
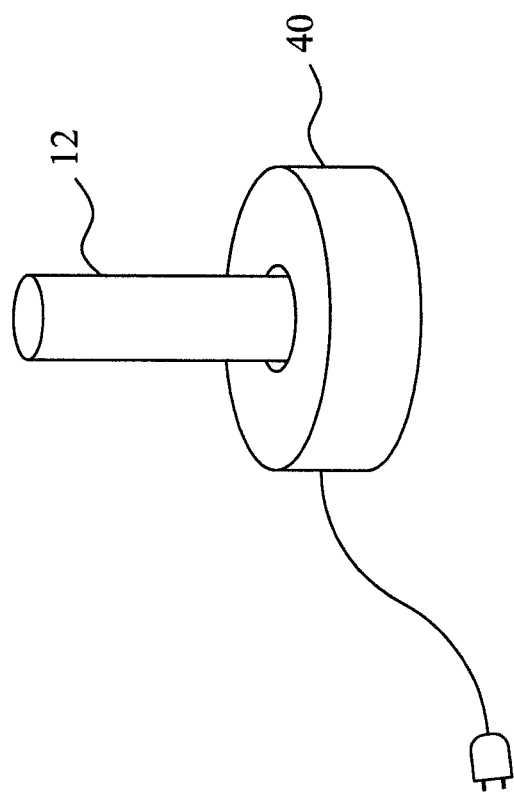
FIG. 7 is a diagram showing an embodiment in which magnetic force is used to charge an electronic stylus.

In the embodiment shown in FIG. 5, a battery 3402 is used as the power source of the electronic stylus 12; in other embodiments, the electronic stylus 12 may also be powered by other means. FIG. 6 is a diagram showing an embodiment in which a radio-frequency (RF) signal is used to charge the electronic stylus 12. In this embodiment, the capacitive touchpad module 14 emits, from an antenna thereof, an RF signal Spower which is received by the electronic stylus 12 to generate an induction current for power supply necessary to generate the excitation signal Srf. When the electronic stylus 12 touches the capacitive touchpad module 14, the excitation signal Srf emitted by the electronic stylus 12 will apply to the trace of the capacitive touchpad module 14 near the touch point. A microprocessor of the capacitive touchpad module 14 can make computations and reports coordinates of the touch point. Alternatively, FIG. 7 is a diagram showing an embodiment in which magnetic force is used to charge the electronic stylus 12. The principal of this embodiment is that, the electronic stylus 12 equipped with an induction coil is inserted into a charging dock 40 having a time-varying magnetic field generated therein so that, through interaction of the time-varying magnetic field with the coil of the electronic stylus 12, an induction voltage is generated to charge the electronic stylus 12.

Figure 8:
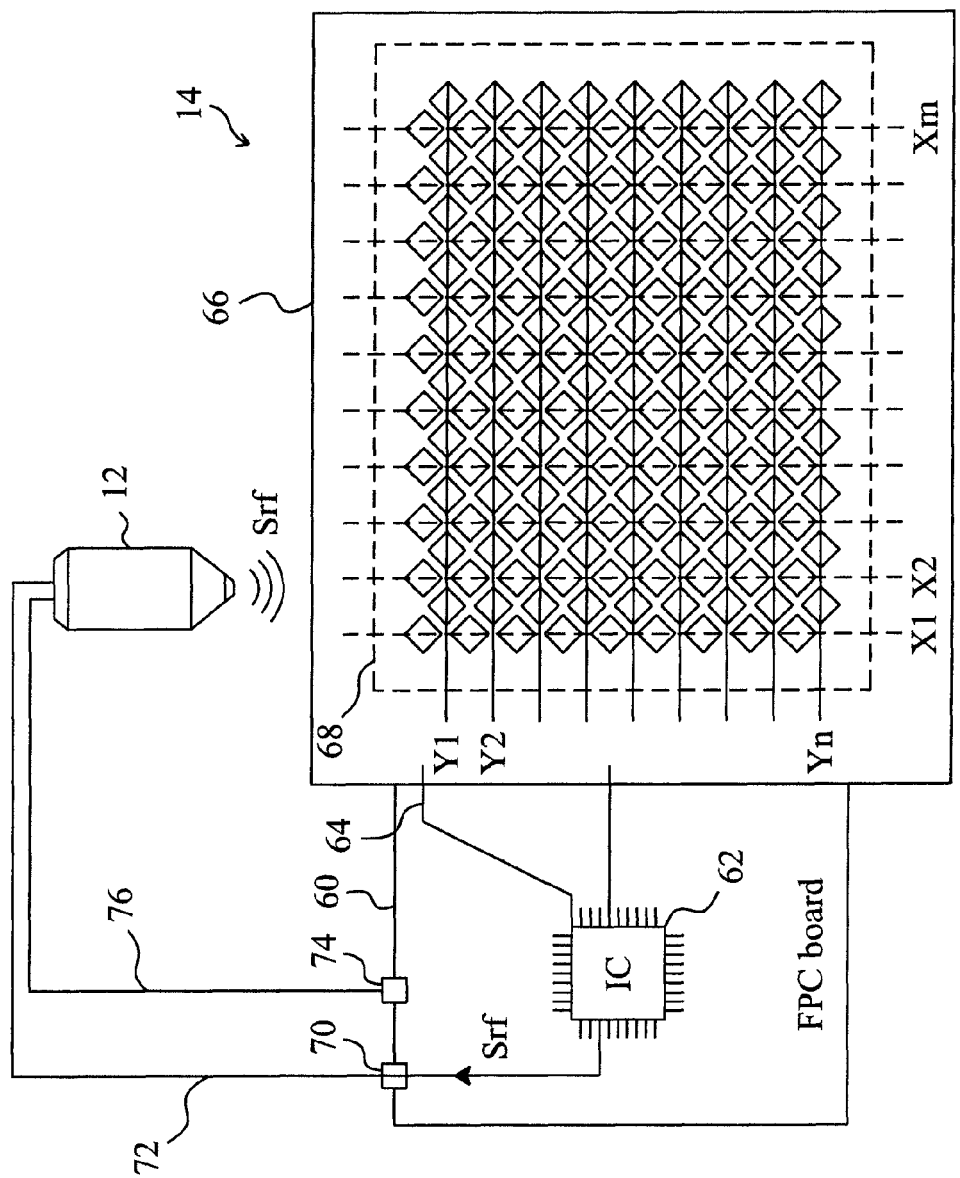
FIG. 8 is a diagram showing an embodiment of a wired apparatus for touch input according to the present invention.

FIG. 8 is a diagram showing an embodiment of a wired apparatus for touch input according to the present invention. In this embodiment, the capacitive touchpad module 14 includes an FPC board 60, or may be the same PCB on a substrate 66, a detection circuit 62 is disposed on the FPC board 60 and is connected to the substrate 66 through conductive wires, the substrate 66 may be a glass plate, a plastic membrane, or a PCB, and traces 68, which may be made from an ITO thin film or another kind of conductor, are printed on the substrate 66. The capacitive touchpad module 14 charges/discharges the traces 68 at a charging/discharging frequency one by one sequentially, and each of the traces 68 will generate a charging/discharging signal, through a respective conductive wire 64, for the detection circuit 62 to generate an excitation signal Srf which is transmitted from an output terminal 70 of the capacitive touchpad module 14 through a signal line 72 to the electronic stylus 12 and then emitted by the tip of the electronic stylus 12. A ground line 76 of the capacitive touchpad module 14 is connected to the electronic stylus 12 through an output terminal 74. In FIG. 8, provided by the detection circuit 62, the excitation signal Srf is synchronous to and has a constant phase difference from the charging/discharging signal detected from the conductive wire 64, and the frequency of the excitation signal Srf is an integral multiple, for example one, two, three, or more times, of that of the charging/discharging signal detected from the conductive wire 64. The phase difference may be zero.

Figure 9:
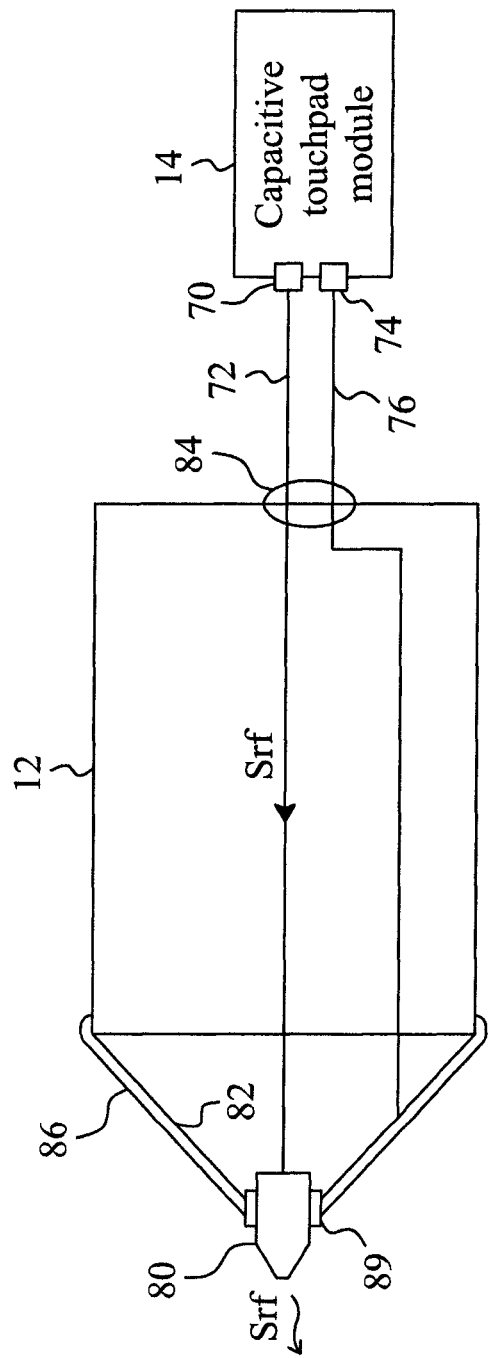
FIG. 9 is a diagram showing an embodiment for the electronic stylus of FIG. 8.

FIG. 9 is a diagram showing an embodiment for the electronic stylus 12 of FIG. 8, in which a tip 80 is connected to the signal line 72 through an input terminal 84 so as to emit the excitation signal Srf received from the capacitive touchpad module 14, a metal 82 wraps around the tip 80 to prevent EMI and is connected to the ground line 76 via the input terminal 84, an insulator 86 wraps around the metal 82 to shield against ambient interference, between the tip 80 and the metal 82 is disposed an isolating insulator 89. The tip 80 may be a metal, a flexible conductor, or a metal wrapped by a nonconductor.

Figure 10:
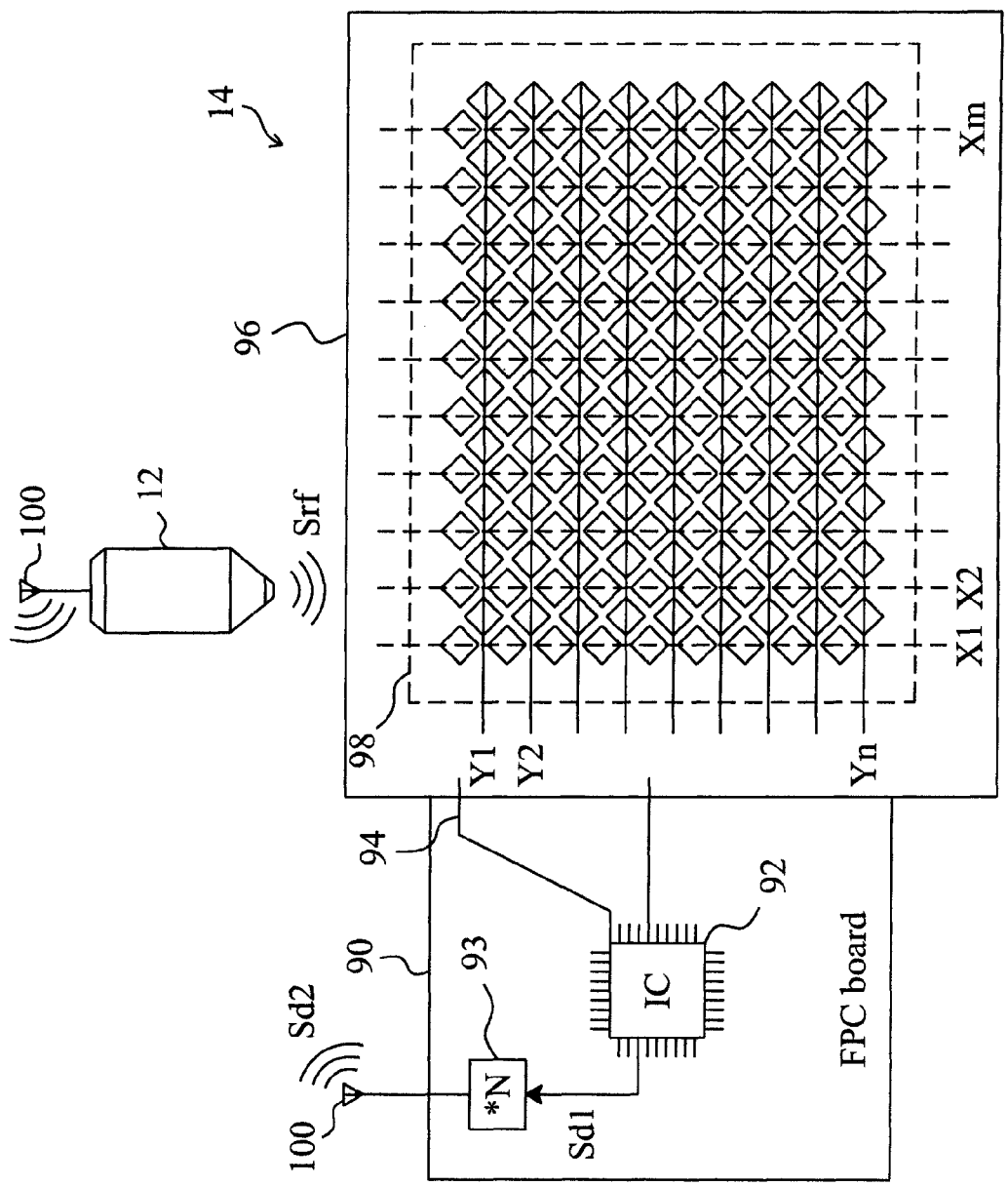
FIG. 10 is a diagram showing a first embodiment of a wireless apparatus for touch input according to the present invention.

FIG. 10 is a diagram showing a first embodiment of a wireless apparatus for touch input according to the present invention. In this embodiment, the capacitive touchpad module 14 includes an FPC board 90, or may be the same PCB on a substrate 96, a detection circuit 92 and an up-converter circuit 93 are disposed on the FPC board 90, the detection circuit 92 is connected to the up-converter circuit 93 and the substrate 96 through conductive wires, the substrate 96 may be a glass plate, a plastic membrane, or a PCB, and traces 98, which may be made from an ITO thin film or another kind of conductor, are printed on the substrate 96. The capacitive touchpad module 14 charges/discharges the traces 68 at a charging/discharging frequency one by one sequentially, and each of the traces 68 will generate a charging/discharging signal, through a respective conductive wire 94, for the detection circuit to generate a detection signal Sd1 whose frequency is up-converted by the up-converter circuit 93 to generate a high-frequency signal Sd2, for example, within the ISM frequency band or the U-NII frequency band. The high-frequency signal Sd2 is then delivered by a wireless transceiver system 100 to the electronic stylus 12 where the high-frequency signal Sd2 is down-converted to generate the excitation signal Srf which is synchronous to and has a constant phase difference from the charging/discharging signal detected from the conductive wire 94. The phase difference may be zero. The frequency of the excitation signal Srf is an integral multiple of that of the charging/discharging signal detected from the conductive wire 94.

Figure 11:
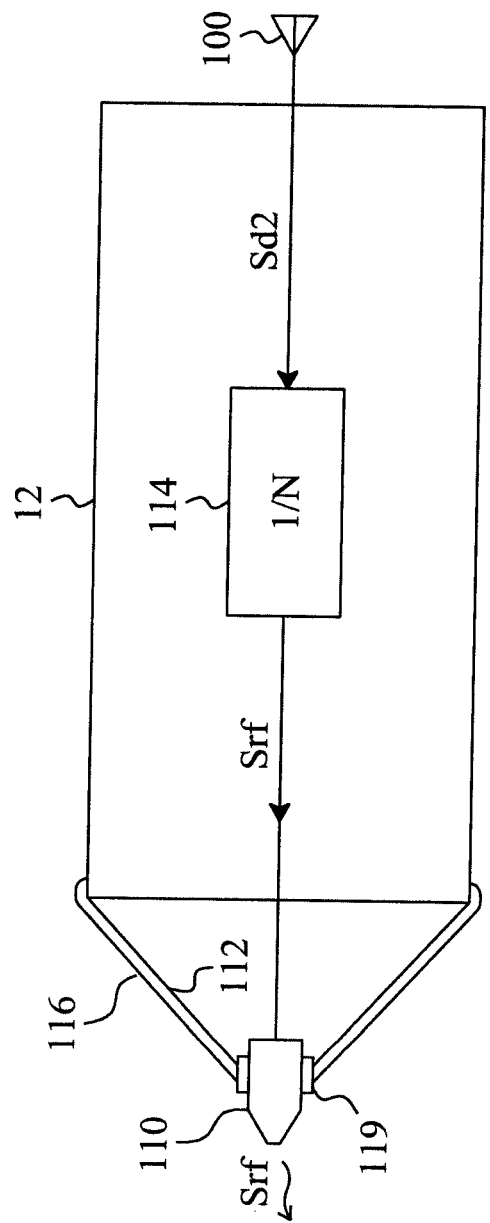
FIG. 11 is a diagram showing an embodiment for the electronic stylus of FIG. 10.

FIG. 11 is a diagram showing an embodiment for the electronic stylus 12 of FIG. 10, in which a down-converter circuit 114 down-converts the high-frequency signal Sd2 received from the wireless transceiver system 100 to generate the excitation signal Srf which is then emitted by a tip 110, a metal 112 wraps around the tip 110 to prevent EMI, an insulator 116 wraps around the metal 112 to shield against ambient interference, and between the tip 110 and the metal 112 is disposed an isolating insulator 119. The tip 110 may be a metal, a flexible conductor, or a metal wrapped by a nonconductor.

Figure 12:
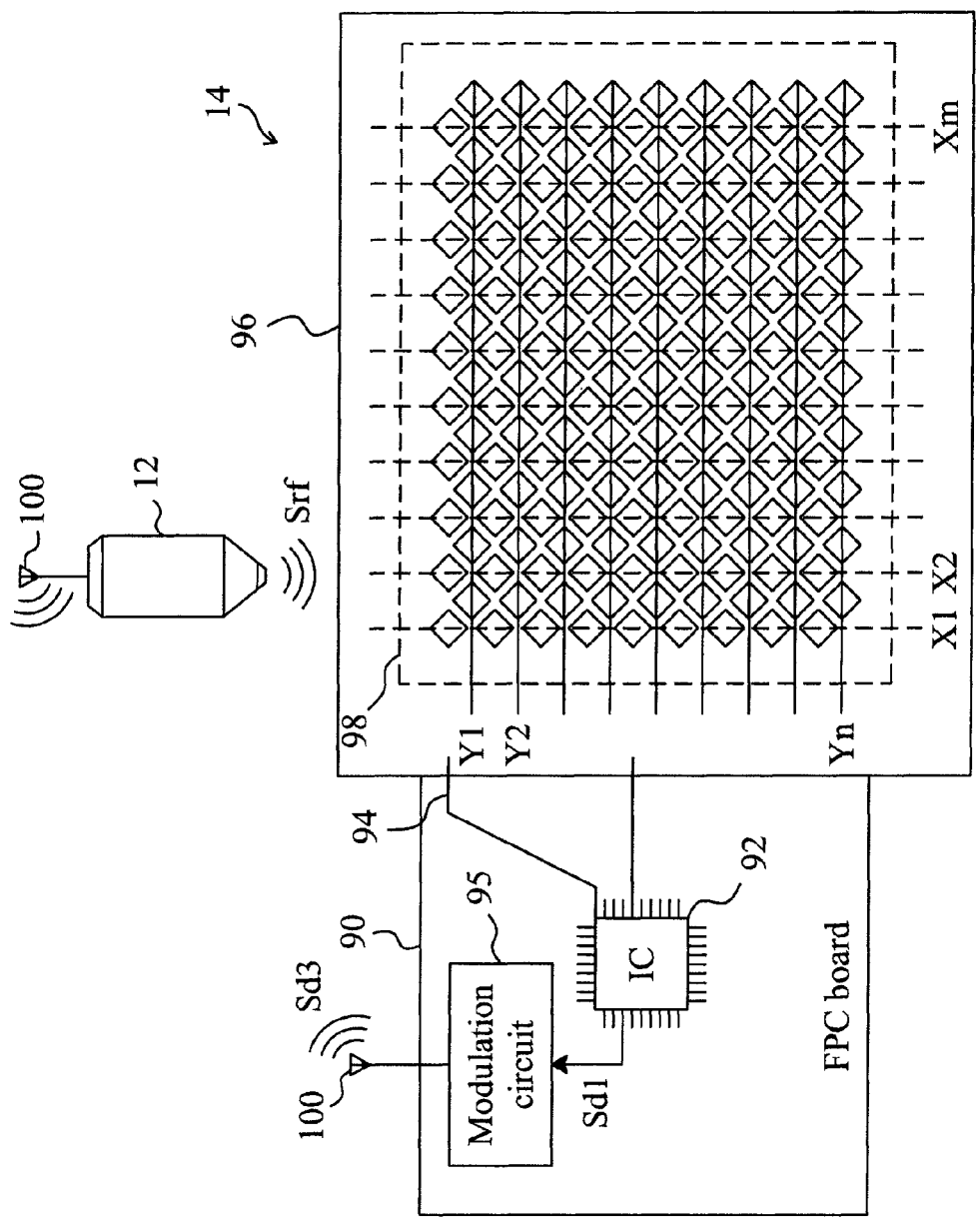
FIG. 12 is a diagram showing a second embodiment of a wireless apparatus for touch input according to the present invention.

FIG. 12 is a diagram showing a second embodiment of a wireless apparatus for touch input according to the present invention. In this embodiment, in addition to most of the elements shown in FIG. 10, it is a modulation circuit 95 to modulate the detection signal Sd1 to generate a carrier Sd3 which is then transmitted by the wireless transceiver system 100 to the electronic stylus 12 where the carrier Sd3 is demodulated into the excitation signal Srf. In other embodiments, the modulation circuit 95 may also incorporate the detection signal Sd1 or the charging/discharging signal detected from the conductive wire 94 as data into the carrier Sd3 for transmission to the electronic stylus 12, so that the data carried by the carrier Sd3 can be unpacked through demodulation by the electronic stylus 12 to generate the excitation signal Srf according to the data.

Figure 13:
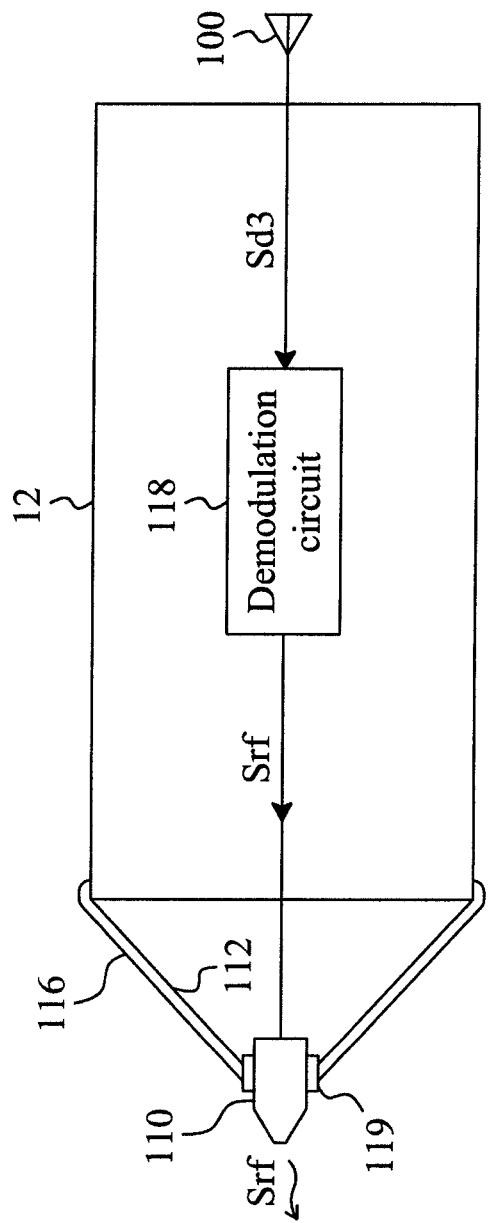
FIG. 13 is a diagram showing an embodiment for the electronic stylus of FIG. 12.

FIG. 13 is a diagram showing an embodiment for the electronic stylus 12 of FIG. 12, in which it is a demodulation circuit 118 to demodulate the carrier Sd3 into the excitation signal Srf, in addition to most of the elements shown in FIG. 11. In other embodiments, data carried by the carrier Sd3 is unpacked through demodulation of the carrier Sd3 by the demodulation circuit 118 to generate the excitation signal Srf according to the data.

Figure 14:
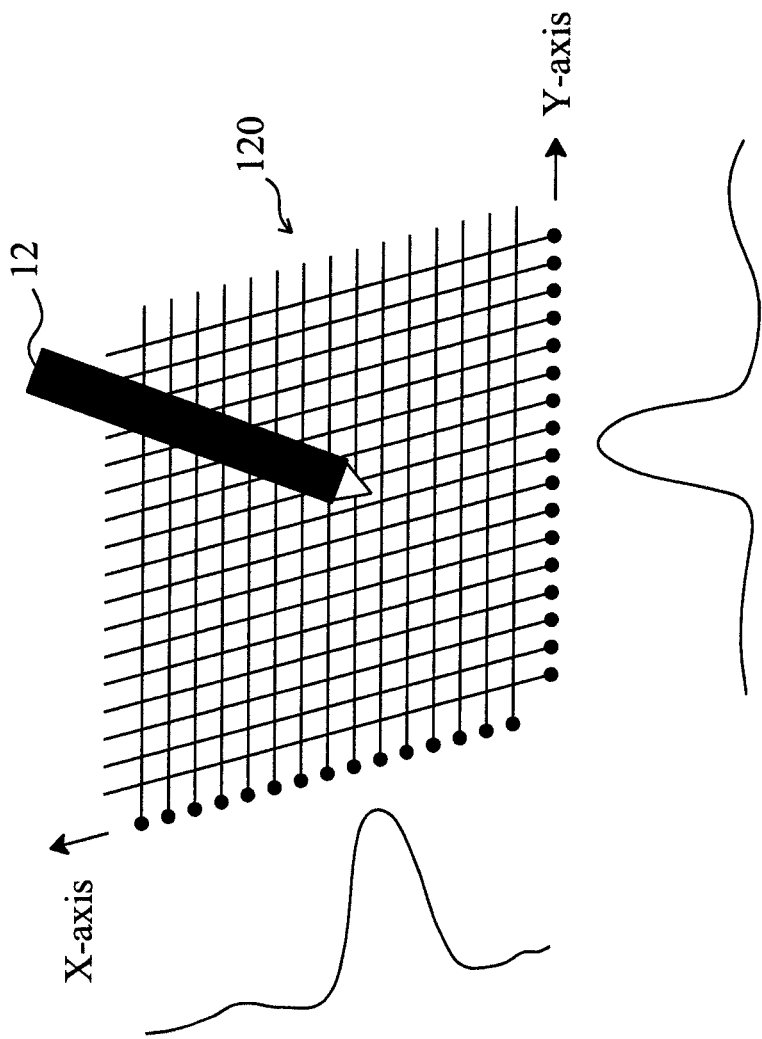
FIG. 14 is a diagram showing a self-capacitance touch sensor.
Figure 15:
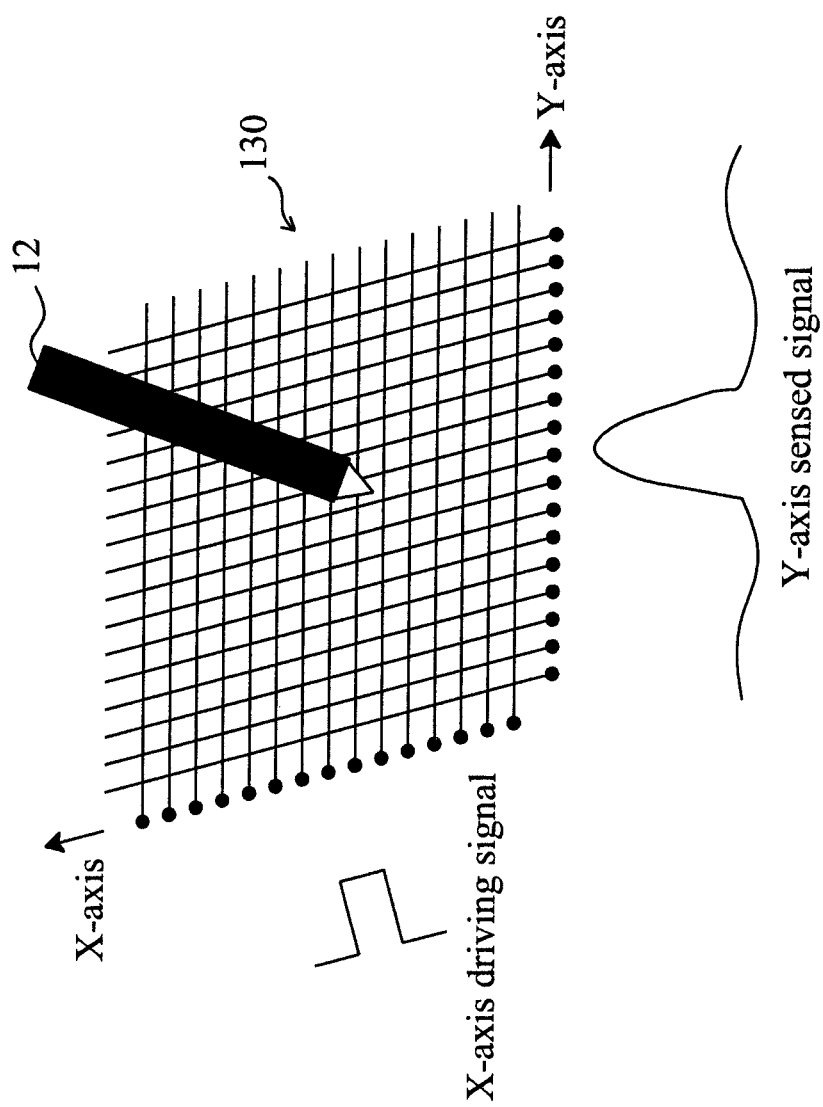
FIG. 15 is a diagram showing a mutual capacitance touch sensor.

Projected capacitance touchpad modules may be classified into types of self-capacitance and mutual capacitance. FIG. 14 is a diagram showing a self-capacitance touch sensor 120, which senses a touch point with X-axis traces and Y-axis traces by scanning firstly the X-axis traces and then the Y-axis traces, or by scanning firstly the Y-axis traces and then the X-axis traces. When the electronic stylus 12 touches the self capacitance touch sensor 120, the excitation signal Srf emitted by the electronic stylus 12 will cause both the analog-to-digital conversion (ADC) value of the X-axis trace near the touch point and the ADC value of the Y-axis trace near the touch point to increase, so a microprocessor of the self capacitance touch sensor 120 can identify the touch pint by calculating the maximum ADC values in the X-axis and in the Y-axis. FIG. 15 is a diagram showing a mutual capacitance touch sensor 130, in which a driving signal is applied to one axis for sensing of capacitance values made to the other axis. In this embodiment, it is presumed that the driving signal is applied to the X-axis traces and the capacitance values are sensed from the Y-axis traces. When the electronic stylus 12 touches the mutual capacitance touch sensor 130, the excitation signal Srf emitted by the electronic stylus 12 will cause both the ADC values of the X-axis trace and the Y-axis trace near the touch point to increase. For sensing the capacitance values from the Y-axis traces, the mutual capacitance touch sensor 130 applies a driving signal to the X-axis traces one by one sequentially. Specifically, when the driving signal is applied to the trace X1, the mutual capacitance touch sensor 130 senses the capacitance values of all the Y-axis traces for a maximum one thereof, that is greater than a preset threshold; then when the driving signal is applied to the next trace X2, the mutual capacitance touch sensor 130 senses the capacitance values of all the Y-axis traces again, for a maximum one thereof, that is greater than the preset threshold; and so on. Once all the X-axis traces have been driven, the mutual capacitance touch sensor 130 applies a driving signal to each the Y-axis traces one by one sequentially for sensing the capacitance values of all the X-axis traces. Finally, a set of global maximum capacitance values is identified, and the X-axis and Y-axis coordinates corresponding to which are the coordinates of the touch point of the electronic stylus 12.

Figure 16A:
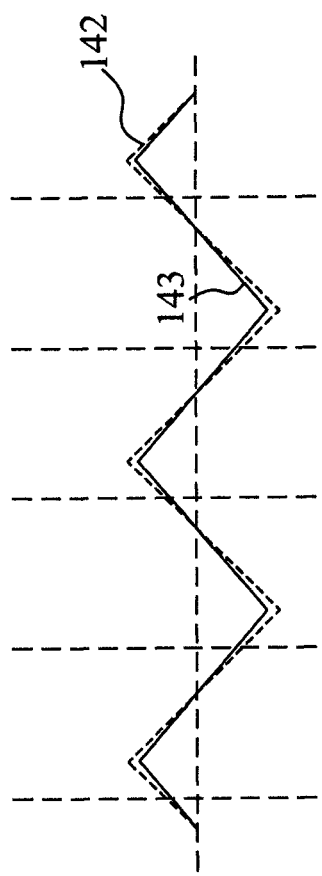
FIGS. 16a-16c are diagrams showing the way that an excitation signal changes the charging/discharging waveform in a trace of a capacitive touchpad module.
Figure 16B:
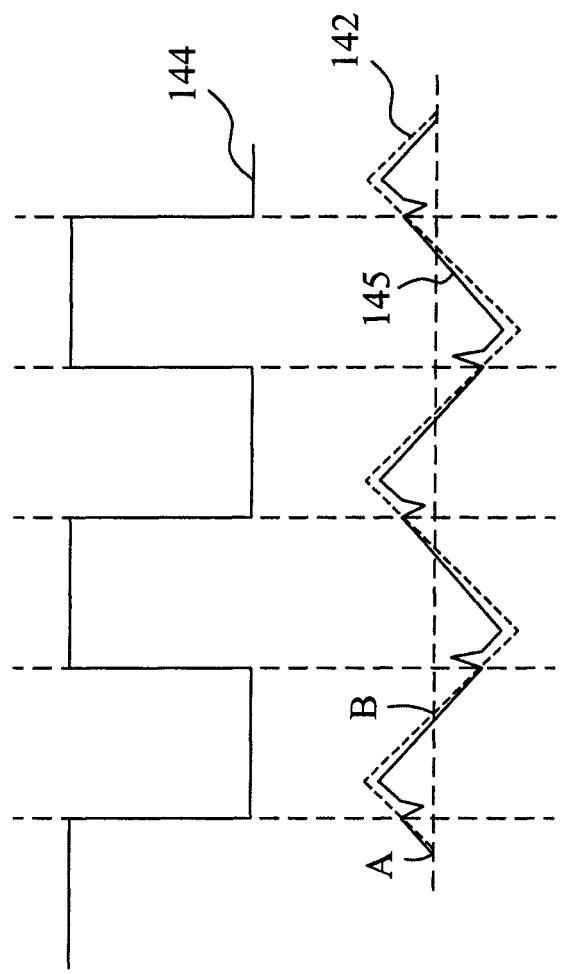
Figure 16C:
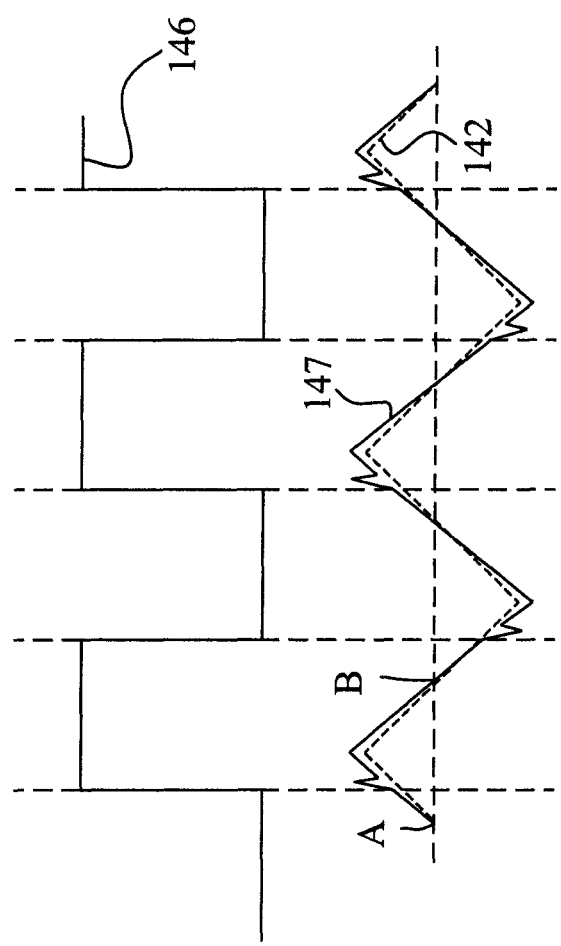

FIGS. 16a-16c are diagrams showing the way that the excitation signal Srf changes the charging/discharging waveform in a trace of the capacitive touchpad module 14.

In FIG. 16a, the waveform 142 represents the charging/discharging signal detected from a trace of the capacitive touchpad module 14 when no object touches thereto. When this trace is touched by a finger, the waveform of the charging/discharging signal detected therefrom will change from the waveform 142 to the waveform 143, by which the amplitude of the charging/discharging waveform in the trace decreases due to the capacitance variation thereof.

In FIG. 16b, the waveform 144 represents an excitation signal Srf according to the present invention, which changes the charging/discharging signal detected from a touched trace from the waveform 142 to the waveform 145. Before the excitation signal Srf emitted by the electronic stylus 12 is applied to the touched trace, the detected charging/discharging signal has the waveform 142. When the excitation signal Srf is applied to the touched trace, if a falling edge of the excitation signal Srf is aligned to an increasing ramp of the waveform 142, and a rising edge of the excitation signal Srf is aligned to a decreasing ramp of the waveform 142, as shown by the waveforms 144 and 145, the voltage amplitude of the charging/discharging signal 145 will experience a decrease. In this case, the ADC value extracted by the capacitive touchpad module 14 demodulating the charging/discharging signal will increase, which effect is similar to the variation of the charging/discharging signal induced by a finger's touch as shown by the waveform 143. Thus, the capacitive touchpad module 14 can sense a touch point of the electronic stylus 12 according to such variation, as it does for a finger's touch.

On the contrary, as shown in FIG. 16c, if a rising edge of an excitation signal Srf 146 is aligned to an increasing ramp of the waveform 142, and a falling edge of the excitation signal Srf 146 is aligned to a decreasing ramp of the waveform 142, the voltage amplitude of the charging/discharging signal will experience an increase as shown by the waveform 147. In this case, the ADC value extracted by the capacitive touchpad module 14 demodulating the charging/discharging signal will decrease, which effect is different from that induced by a finger's touch. Accordingly, by setting the excitation signal Srf in such a way that a rising edge thereof is aligned to an increasing ramp of the waveform 142, and a falling edge thereof is aligned to a decreasing ramp of the waveform 142, the capacitive touchpad module 14 can further identify whether a touching object is a finger or an electronic stylus depending on an increase or a decrease of the ADC value. In different applications, the capacitive touchpad module 14 may proceed with different processing flows depending on whether the touching object is a finger or an electronic stylus; for example, when it is recognized that the touching object is an electronic stylus, the coordinate resolution of the capacitive touchpad module 14 may be increased.

The above description is not intended to limit any relationship between the charging/discharging signal and the ADC value. In other embodiments, depending on different signal processing procedures, it might also be possible that the corresponding ADC value is increased when the voltage amplitude of the charging/discharging signal experiences an increase or is decreased when the voltage amplitude of the charging/discharging signal experiences a decrease.

The phase relationship between an excitation signal Srf and a charging/discharging signal may be adjusted. For example, the waveform 144 shown in FIG. 16b may be set in such a way that a falling edge thereof is aligned to the center point A of an increasing ramp of the waveform 142, and a rising edge thereof is aligned to the center point B of a decreasing ramp of the waveform 142, by which a maximum decrease in the signal amplitude can be obtained. Alternatively, the waveform 146 shown in FIG. 16c may be set in such a way that a rising edge thereof is aligned to the center point A of an increasing ramp of the waveform 142, and a falling edge thereof is aligned to the center point B of a decreasing ramp of the waveform 142, by which a maximum increase in the signal amplitude can be obtained.

Figure 17:
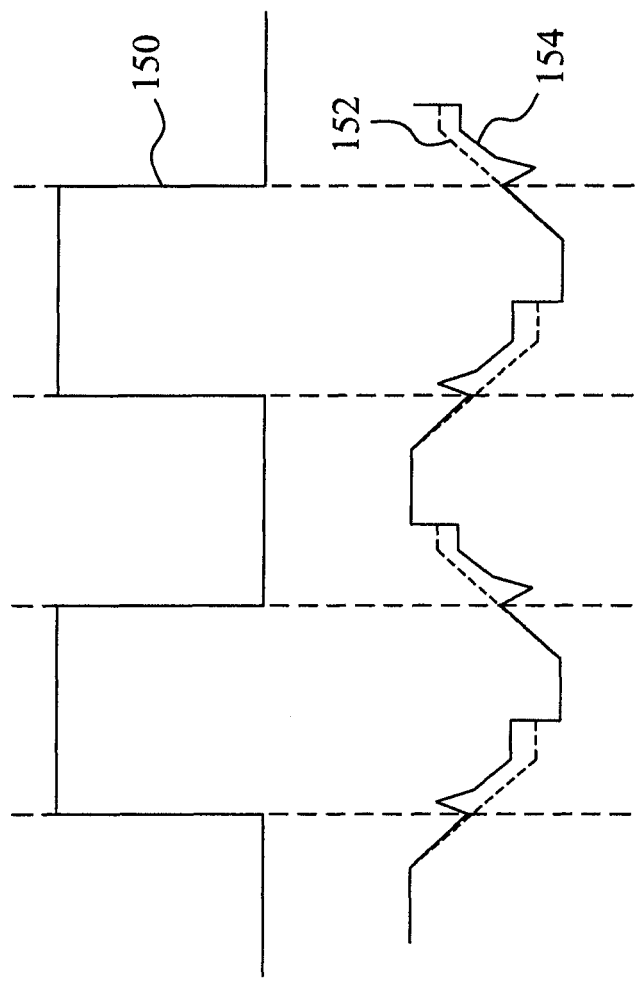
FIG. 17 is a diagram showing an excitation signal and a charging/discharging signal of a waveform other than triangular.

Although a triangular waveform is taken as an example for the charging/discharging signal as shown in FIGS. 16a-c, other waveforms may be used to achieve the same effect. FIG. 17 is a diagram showing an excitation signal Srf and a charging/discharging signal of another kind of waveform, in which the waveform 150 represents the excitation signal Srf and the waveforms 152 and 154 represent the charging/discharging signal without touching and under touching on a trace. Before the electronic stylus 12 touches the capacitive touchpad module 14, the charging/discharging signal in a trace of the capacitive touchpad module 14 has the waveform 152. When the electronic stylus 12 emitting an excitation signal Srf while touches the capacitive touchpad module 14, the charging/discharging signal at the touch point will experience a waveform variation. In case a falling edge of the excitation signal Srf is aligned to an increasing period of the waveform 152, and a rising edge thereof is aligned to a decreasing period of the waveform 152, a decrease in the voltage amplitude of the charging/discharging signal 154 will occur, which effect is just like a variation of the charging/discharging signal induced by a finger's touch. On the contrary, in case a rising edge of the excitation signal Srf is aligned to an increasing period of the waveform 152, and a falling edge of the excitation signal Srf is aligned to a decreasing period of the waveform 152, an increase in the voltage amplitude of the charging/discharging signal 154 will occur, which effect is different from the variation of the charging/discharging signal induced by a finger's touch.

As can be seen in FIGS. 16 and 17, the present invention employs an excitation signal to cause a variation in a charging/discharging signal of the capacitive touchpad module so that an object approaching to or touching the capacitive touchpad module can be distinguished by the capacitive touchpad module according to the variation being an increase or a decrease in its voltage amplitude. The excitation signal Srf emitted by the electronic stylus is not limited to a square wave, but may be a triangular wave or other kinds of waveforms.

Figure 18:
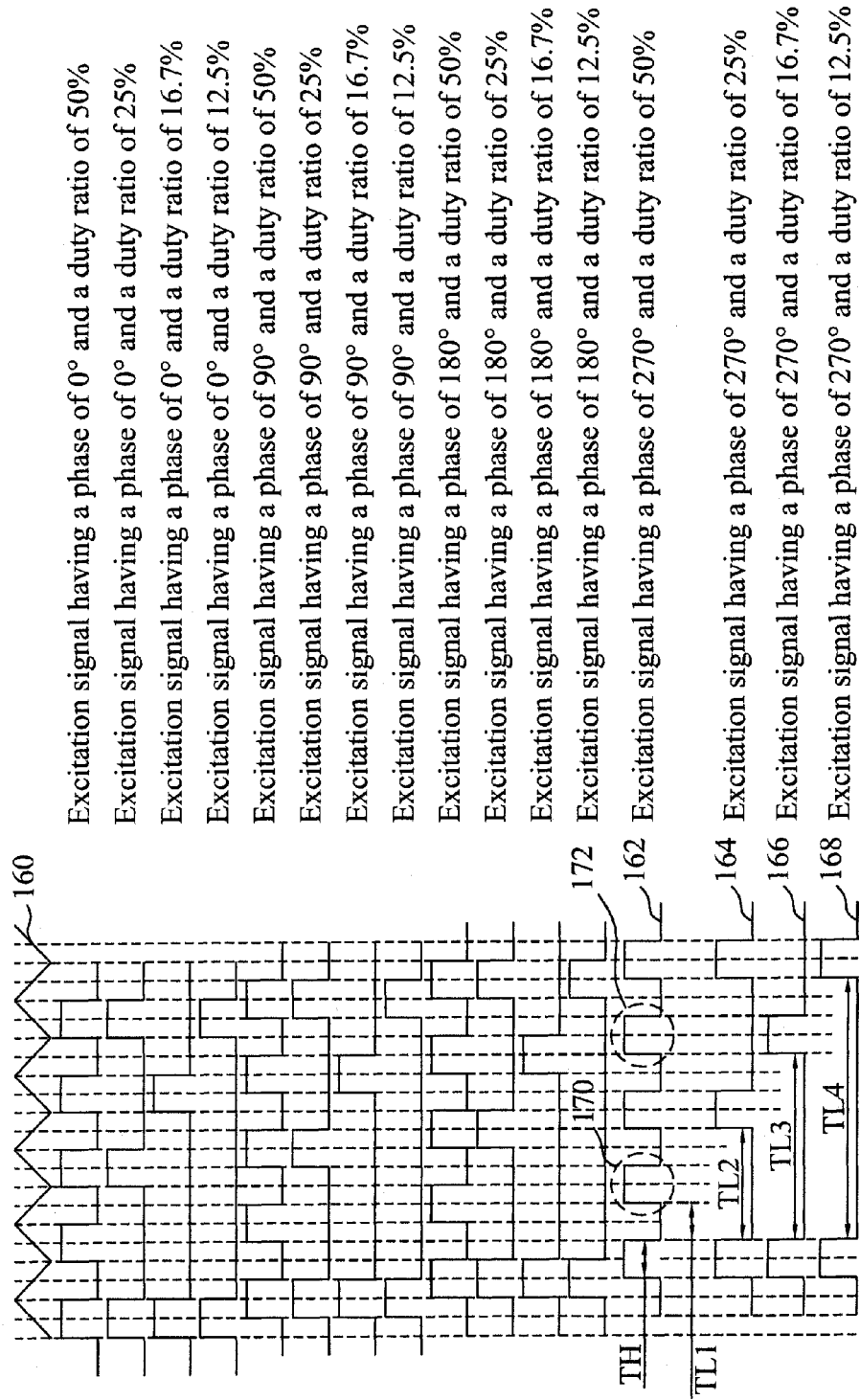
FIG. 18 is a diagram showing an excitation signal having different phases and different duty ratios.

The intensity of the excitation signal Srf emitted by the electronic stylus 12 is adjusted to be a suitable level. If its intensity were set too high, the electronic stylus 12 would be detected when it actually has not touched the capacitive touchpad module 14 yet; on the contrary, if its intensity is set too low, the electronic stylus 12 would fail to be detected even when it touches on the capacitive touchpad module 14. The intensity of the excitation signal Srf may be adjusted by adjusting a peak voltage and a duty ratio of the excitation signal Srf. FIG. 18 is a diagram showing the excitation signal Srf having different phases and different duty ratios, in which the charging/discharging signal is represented by the waveform 160. Taking the excitation signals Srf having a phase of 270° as an example, as shown by the waveforms 162 and 164, an excitation signal having a duty ratio TH/(TH+TL1) of 50% will induce a decreased voltage amplitude of the capacitive touchpad module 14 greater than that of having a duty ratio TH/(TH+TL2) of 25%. In other words, an excitation signal Srf having a duty ratio of 50% has a greater intensity than that of having a duty ratio of 25%. Likewise, as shown by the waveform 166, an excitation signal Srf having a duty ratio TH/(TH+TL3) of 16.7% has a lower intensity and accordingly, will induce a decreased voltage amplitude of the capacitive touchpad module 14 less than that of having a duty ratio of 25%; in turn, an excitation signal Srf having a duty ratio TH/(TH+TL4) of 12.5% has a lower intensity and accordingly, will induce a decreased voltage amplitude of the capacitive touchpad module 14 less than that of having a duty ratio of 16.7%, as shown by the waveform 168. There exist a number of ways to adjust a duty ratio of an excitation signal Srf, for example, by masking a portion of the excitation signal Srf. Referring to the waveforms 162 and 164 shown in FIG. 18, by masking pulses 170 and 172 of the excitation signal Srf having a duty ratio of 50%, an excitation signal Srf having a duty ratio of 25% can be obtained.

While the present invention has been described in conjunction with preferred embodiment thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. An apparatus for touch input, comprising:
a capacitive touchpad module actively driving a plurality of traces with a charging/discharging signal, the capacitive touchpad module including a detection circuit connected to the plurality of traces for detecting the charging/discharging signal conducted by the plurality of traces and sensing a touch input responsive to a capacitive coupling to the capacitive touchpad module changing an amplitude of the charging/discharging signal input to the detection circuit from at least two orthogonal traces of the plurality of traces, the detection circuit generating an excitation signal to have a fixed relationship with respect to a phase and a frequency of the charging/discharging signal; and
an electronic stylus coupled to the detection circuit for receiving the excitation signal therefrom, the electronic stylus including a longitudinally extended housing, a conductive tip disposed at one end of the housing and an insulator disposed between the conductive tip and the housing to provide electrical isolation therebetween, the excitation signal being output from the conductive tip, the excitation signal being capacitively coupled to the least two orthogonal traces of the plurality of traces of the capacitive touchpad module near a touch point when the tip of the electronic stylus touches the capacitive touchpad module, the capacitive coupling of the excitation signal to the at least two orthogonal traces altering the amplitude of the charging/discharging signal to thereby simulate the touch input by a user's finger.

2. The apparatus of claim 1, wherein the excitation signal has a frequency which is an integral multiple of that of the charging/discharging signal.

3. The apparatus of claim 1, wherein the excitation signal has a constant phase difference from the charging/discharging signal.

4. The apparatus of claim 1, wherein the excitation signal has a frequency equal to that of the charging/discharging signal and a duty ratio of 50%.

5. The apparatus of claim 1, wherein the excitation signal has a frequency equal to one half of that of the charging/discharging signal and a duty ratio of 25%.

6. The apparatus of claim 1, wherein the excitation signal has a frequency equal to one third of that of the charging/discharging signal and a duty ratio of 16.7%.

7. The apparatus of claim 1, wherein the excitation signal has a frequency equal to one quarter of that of the charging/discharging signal and a duty ratio of 12.5%.

8. The apparatus of claim 1, wherein the tip comprises a metal wrapped by a nonconductor.

9. The apparatus of claim 1, wherein the excitation signal has a waveform where rising edges thereof coincide with rising edges of a waveform of the charging/discharging signal to thereby enable the detection circuit to distinguish a touch input being made by the electronic stylus from a touch input being made by a user's finger.

10. The apparatus of claim 1, wherein the electronic stylus is wirelessly coupled to the detection circuit and the capacitive touchpad module further comprises:
    an up-converter circuit connected to the detection circuit for up-converting the excitation signal to generate a high-frequency signal; and
    a transceiver system connected to the up-converter circuit for transmitting the high-frequency signal to the electronic stylus.

11. The apparatus of claim 10, wherein the electronic stylus comprises:
    a down-converter circuit for receiving and down-converting the high-frequency signal to recover the excitation signal, the down-converter circuit having an output coupled to the conductive a tip for emitting the excitation signal.

12. The apparatus of claim 1, wherein the electronic stylus is wirelessly coupled to the detection circuit and the capacitive touchpad module further comprises:
    a modulation circuit connected to the detection circuit for modulating the excitation signal to generate a carrier modulated by the excitation signal; and
    a transceiver system connected to the modulation circuit for transmitting the carrier to the electronic stylus.

13. The apparatus of claim 12, wherein the electronic stylus comprises:
    a demodulation circuit for receiving and demodulating the carrier to recover the excitation signal, the demodulation circuit having an output coupled to the conductive for emitting the excitation signal.

14. A control method for a capacitive touchpad, the control method comprising:
    providing a capacitive touchpad module having a plurality of traces formed thereon;
    actively driving the plurality of traces with a charging/discharging signal;
    providing a detection circuit connected to the plurality of traces for detecting the charging/discharging signal conducted by the plurality of traces;
    responsive to a user's finger being brought into proximity to the capacitive touchpad module, detecting a change in an amplitude of the charging/discharging signal by the detection circuit for at least two of the plurality of traces disposed orthogonally with respect to one another and thereby identifying a touch input;
    providing an electronic stylus;
    generating an excitation signal having a fixed relationship with respect to a frequency and a phase of the charging/discharging signal;
    supplying the excitation signal to a tip of the electronic stylus for emission therefrom; and
    responsive to bringing the tip of the electronic stylus in proximity to the capacitive touchpad module, the emitted excitation signal being capacitively coupled to traces of the capacitive touchpad module, detecting a change in the amplitude of the charging/discharging signal by the detection circuit and for at least two of the plurality of traces disposed orthogonally with respect to one another in proximity to the tip of the electronic stylus and thereby simulate the touch input by a user's finger;
    wherein the touch input from either one of a user's finger or the electronic stylus is detectable.

15. The control method of claim 14, wherein the step of generating an excitation signal having a fixed relationship with respect to a frequency of the charging/discharging signal includes the step of generating the excitation signal having a frequency equal to an integral multiple of a frequency of the charging/discharging signal.

16. The control method of claim 14, wherein the step of generating an excitation signal having a fixed relationship with respect to a frequency of the charging/discharging signal includes the step of generating the excitation signal having a frequency equal to that of the charging/discharging signal and a duty ratio of 50%.

17. The control method of claim 14, wherein the step of generating an excitation signal having a fixed relationship with respect to a frequency of the charging/discharging signal includes the step of generating the excitation signal having a frequency equal to one half of that of the charging/discharging signal and a duty ratio of 25%.

18. The control method of claim 14, wherein the step of generating an excitation signal having a fixed relationship with respect to a frequency of the charging/discharging signal includes the step of generating the excitation signal having a frequency equal to one third of that of the charging/discharging signal and a duty ratio of 16.7%.

19. The control method of claim 14, wherein the step of generating an excitation signal having a fixed relationship with respect to a frequency of the charging/discharging signal includes the step of generating the excitation signal having a frequency equal to one quarter of that of the charging/discharging signal and a duty ratio of 12.5%.

20. The control method of claim 14, wherein the step of generating an excitation signal comprises:
    responsive to the charging/discharging signal, the detection circuit generating a detection signal;
    up-converting the detection signal for generating a high-frequency signal;
    transmitting the high-frequency signal to the electronic stylus; and
    receiving and down-converting the high-frequency signal for generating the excitation signal.

21. The control method of claim 14, wherein the step of generating an excitation signal comprises:
    responsive to the charging/discharging signal, the detection circuit generating a detection signal;
    modulating the detection signal for generating a modulated carrier signal;
    transmitting the modulated carrier signal to the electronic stylus; and receiving and demodulating the modulated carrier signal for generating the excitation signal.

22. The control method of claim 14, wherein the step of generating an excitation signal comprises:
- responsive to the charging/discharging signal 1, the detection circuit generating a detection signal;
- embedding data representing one of the detection signal or the charging/discharging signal into a carrier signal;
- transmitting the carrier signal to the electronic stylus;
- extracting the data from the carrier signal; and
- generating the excitation signal in correspondence to the extracted data.

23. The control method of claim 14, wherein the step of generating an excitation signal includes the step of generating the excitation signal with a waveform thereof having rising edges that coincide with rising edges of a waveform of the charging/discharging signal to thereby enable the detection circuit to distinguish a touch input being made by the electronic stylus from a touch input being made by a user's finger.

24. A control method for a capacitive touchpad, the control method comprising:
- providing a capacitive touchpad module having a plurality of traces formed thereon;
- actively driving the plurality of traces with a charging/discharging signal;
- providing a detection circuit connected to the plurality of traces for detecting the charging/discharging signal conducted by the plurality of traces;
- detecting a decrease in an amplitude of the charging/discharging signal by the detection circuit for at least two of the plurality of traces disposed orthogonally with respect to one another and thereby identifying a touch input as being made by a user's finger;
- providing an electronic stylus;
- generating an excitation signal having a fixed relationship with respect to a frequency of the charging/discharging signal, the excitation signal having a fixed phase relationship with the charging/discharging signal where a waveform of the excitation signal has rising edges that coincide with rising edges of a waveform of the charging/discharging signal;
- supplying the excitation signal to a tip of the electronic stylus for emission therefrom; and
- responsive to bringing the tip of the electronic stylus in proximity to the capacitive touchpad module, the emitted excitation signal being capacitively coupled to the capacitive touchpad module, detecting an increase in the amplitude of the charging/discharging signal by the detection circuit and for at least two of the plurality of traces disposed orthogonally with respect to one another in proximity to the tip of the electronic stylus and thereby identifying a touch input as being made by the electronic stylus;
- wherein the touch input from either one of a user's finger or the electronic stylus is detectable and distinguishable.

25. The method of claim 24, wherein the step of generating an excitation signal includes the step of generating the excitation signal having a frequency which is an integral multiple of the frequency of the charging/discharging signal.

26. The method of claim 24, wherein the step of generating an excitation signal includes the step of generating the excitation signal having a frequency equal to that of the charging/discharging signal and a duty ratio of 50%.

27. The method of claim 24, wherein the step of generating an excitation signal includes the step of generating the excitation signal having a frequency equal to one half of that of the charging/discharging signal and a duty ratio of 25%.

28. The method of claim 24, wherein the step of generating an excitation signal includes the step of generating the excitation signal having a frequency equal to one third of that of the charging/discharging signal and a duty ratio of 16.7%.

29. The method of claim 24, wherein the step of generating an excitation signal includes the step of generating the excitation signal having a frequency equal to one quarter of that of the charging/discharging signal and a duty ratio of 12.5%.

* * * * *